(12) United States Patent
Nilsen (10) Patent No.: US 10,023,254 B1
(45) Date of Patent: Jul. 17, 2018

(54) FOLDABLE SEAT ASSEMBLY FOR SCOOTER AND SCOOTER WITH A FOLDABLE SEAT

(71) Applicant: Stian Nilsen, New York, NY (US)

(72) Inventor: Stian Nilsen, New York, NY (US)

( * ) Notice: Subject to any disclaimer, the term of this patent is extended or adjusted under 35 U.S.C. 154(b) by 0 days.

(21) Appl. No.: 15/401,005

(22) Filed: Jan. 7, 2017

(51) Int. Cl.
| | | |
|---|---|---|
| *B62J 1/08* | (2006.01) | |
| *B62J 1/12* | (2006.01) | |
| *B62K 15/00* | (2006.01) | |
| *B62K 21/02* | (2006.01) | |
| *B62M 7/12* | (2006.01) | |

(52) U.S. Cl.
CPC . *B62J 1/08* (2013.01); *B62J 1/12* (2013.01); *B62K 15/006* (2013.01); *B62K 21/02* (2013.01); *B62K 2202/00* (2013.01); *B62M 7/12* (2013.01)

(58) Field of Classification Search
CPC .............. B62J 1/08; B62J 1/12; B62K 15/006
See application file for complete search history.

(56) References Cited

U.S. PATENT DOCUMENTS 4,611,818 A * 9/1986 Cammarata .......... B62K 15/006
                                                        280/278
9,016,702 B2 * 4/2015 Huang ...................... B62J 1/08
                                                        280/87.041

* cited by examiner

*Primary Examiner* — Kevin Hurley
(74) *Attorney, Agent, or Firm* — Shifrin Patent Law; Dan Shifrin (57) ABSTRACT

A seat assembly for a scooter is provided and is movable from a substantially upright position for a seated user to a lowered position for a standing user. The assembly comprises a seat post and upper and lower mounting plates. The seat post comprises a center plate and side plates connected to opposite sides of the center plate with hinges. Tabs extending from the upper and lower ends of the side plates are mateable with corresponding slots in the upper and lower mounting plates. The upper mounting plate comprises a hinge that is connected to a top edge of the center plate and is attachable to the bottom of a seat. The lower mounting plate comprises a hinge that is connected to a lower edge of the center plate and is attachable to the rear of a foot deck of the scooter.

2 Claims, 8 Drawing Sheets

FOLDABLE SEAT ASSEMBLY FOR SCOOTER AND SCOOTER WITH A FOLDABLE SEAT

TECHNICAL FIELD

The present invention relates generally to scooters and, in particular, to a foldable seat assembly for a scooter and to a convertible stand-up/sit-down scooter.

BACKGROUND ART

Stand-up scooters provide a popular form of recreation and can also provide transportation for relatively short distances. Scooters are typically two-wheeled and foot propelled although three-wheel scooters are available as are motorized scooters. However, riding longer distances can be tiring when the rider is standing, even if the scooter is motorized. Motor scooters, such as mopeds and the well-known Vespa scooters, allow the rider to sit down but are larger and substantially more expensive than typical stand-up recreational scooters.

SUMMARY OF THE INVENTION

Embodiments of the present invention provide a foldable seat assembly for a scooter, comprising a seat post and upper and lower mounting plates. The seat post comprises a center plate and side plates connected to opposite sides of the center plate with hinges. Tabs extending from the upper and lower ends of the side plates are mateable with corresponding slots in the upper and lower mounting plates. The upper mounting plate comprises a hinge that is connected to a top edge of the center plate and is attachable to the bottom of a seat. The lower mounting plate comprises a hinge that is connected to a lower edge of the center plate and is attachable to the rear of a foot deck of the scooter.

The seat assembly is movable from a substantially upright position for a seated user to a lowered position for a standing user. In the substantially upright position, the upper tabs of the side plates are engaged with the slots of the upper mounting plate and the lower tabs of the side plates are engaged with the slots of the lower mounting plate. In the lowered position, the upper tabs of the side plates are withdrawn from the slots of the upper mounting plate and the lower tabs of the side plates are withdrawn from the slots of the lower mounting plate. The center plate and the side plates lie in a plane on top of the foot deck and the seat rests on an upper surface of a neck of the scooter.

Embodiments also provide a scooter, comprising a foot deck, a frame, front and rear wheels, and a foldable seat assembly. The frame comprises a hollow steering tube, an upright stem having a lower portion extending through the steering tube, and an angled neck connected at one end to the steering tube and connected at an opposite end to a front end of the foot deck. The front wheel is attached to the lower portion of the stem and rear wheel is attached to a rear assembly at a rear end of the foot deck Embodiments of the present invention provide a foldable seat assembly for a scooter, comprising a seat post and upper and lower mounting plates. The seat post comprises a center plate and side plates connected to opposite sides of the center plate with hinges. Tabs extending from the upper and lower ends of the side plates are mateable with corresponding slots in the upper and lower mounting plates. The upper mounting plate comprises a hinge that is connected to a top edge of the center plate and is attachable to the bottom of a seat. The lower mounting plate comprises a hinge that is connected to a lower edge of the center plate and is attachable to the rear of a foot deck of the scooter.

The seat assembly is movable from a substantially upright position for a seated user to a lowered position for a standing user. In the substantially upright position, the upper tabs of the side plates are engaged with the slots of the upper mounting plate and the lower tabs of the side plates are engaged with the slots of the lower mounting plate. In the lowered position, the upper tabs of the side plates are withdrawn from the slots of the upper mounting plate and the lower tabs of the side plates are withdrawn from the slots of the lower mounting plate. The center plate and the side plates lie in a plane on top of the foot deck and the seat rests on an upper surface of a neck of the scooter.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figures 1A, 1B:
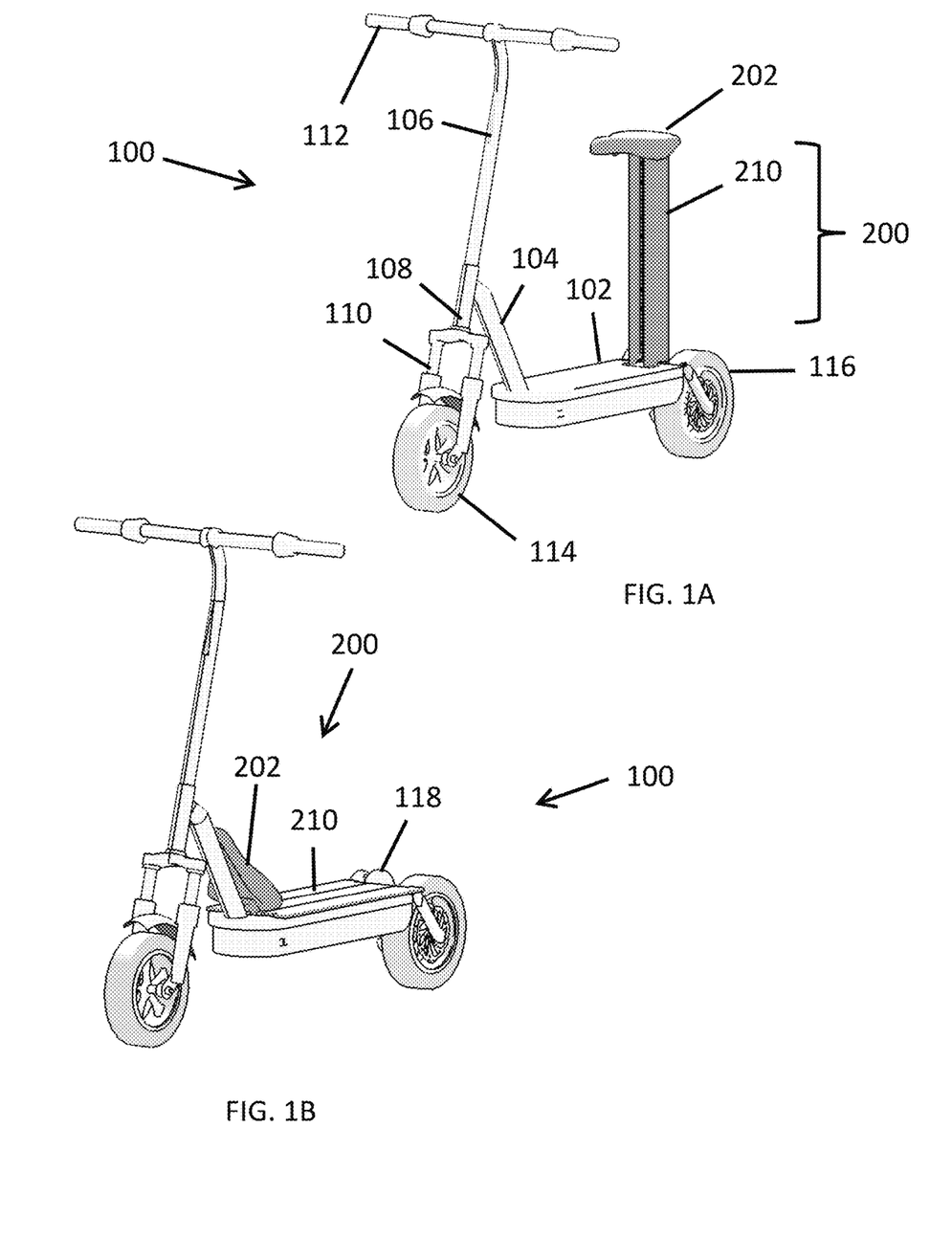
FIG. 1A is a front perspective view of an embodiment of a convertible scooter of the present invention, including a foldable seat assembly in an upright position.
FIG. 1B is a front perspective view of the scooter of FIG. 1A with the seat assembly in a folded position.

FIGS. 1A and 1B are front perspective views of an embodiment of a convertible scooter 100 of the present invention with a foldable seat assembly 200 in an upright position (FIG. 1A) and in a folded position (FIG. 1B). The scooter 100 includes a foot deck 102 and a frame having an angled neck 104 connected at its upper end to a hollow steering tube 108 through which an upright tubular stem 106 extends and extended at its lower end with the front of the deck 102 with. The lower end of the stem 106 is connected with a front fork 110 and the upper end of the stem is connected to handle bars 112. A front wheel 114 is attached to the front fork 110 and a rear wheel 116 is attached to a rear assembly at the back end of the deck 102. Although the scooter 100 is illustrated with a motor 118 also attached to the rear assembly, the motor 118 is optional and the present invention contemplates both motorized and non-motorized configurations without limitation. Further, although the scooter 100 is illustrated with two wheels, the present invention contemplates other wheel configurations, such as two rear wheels, for example.

Figure 2:
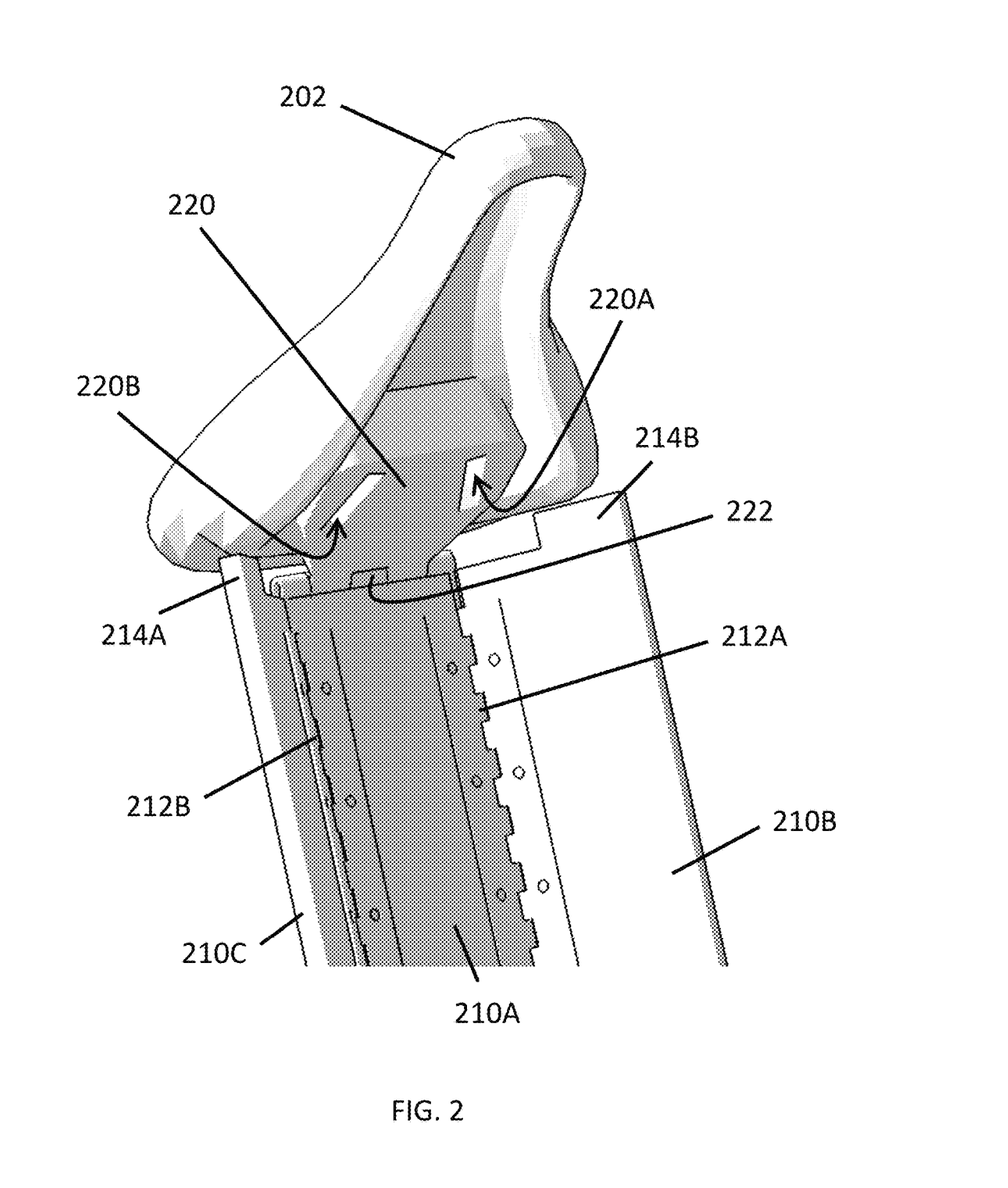
FIG. 2 is a close-up view of the upper seat post attachment of the seat assembly of FIG. 1A.

The foldable seat assembly 200 includes a seat 202 hingeably attached to the upper end of a seat post 210, the lower end of which is hingeably attached to the rear end of the deck 102. FIG. 2 is a close-up view of the upper portion of the seat assembly 200. The seat post 210 may comprise three elongated strips or plates—a center plate 210A, a left side plate 210B, and a right side plate 210C. The left and right side plates 210B, 210C are connected to the left and right sides, respectively, of the center plate 210A with left and right hinges 212A, 212B. The hinges 212A, 212B may be continuous piano-type hinges or may be a set of shorter hinges spaced along the plates 210A, 210B, 210C.

A top mounting plate 220 is connected to the top of the center plate 210A with a top hinge 222 and is also secured to the bottom of the seat 202. Two slots 220A, 220B are formed in the top mounting plate 220. Two tabs 214A, 214B extending from the tops of the left and right side plates 210B, 210C are dimensioned to mate with the two slots 220A, 220B, respectively.

Figure 3:
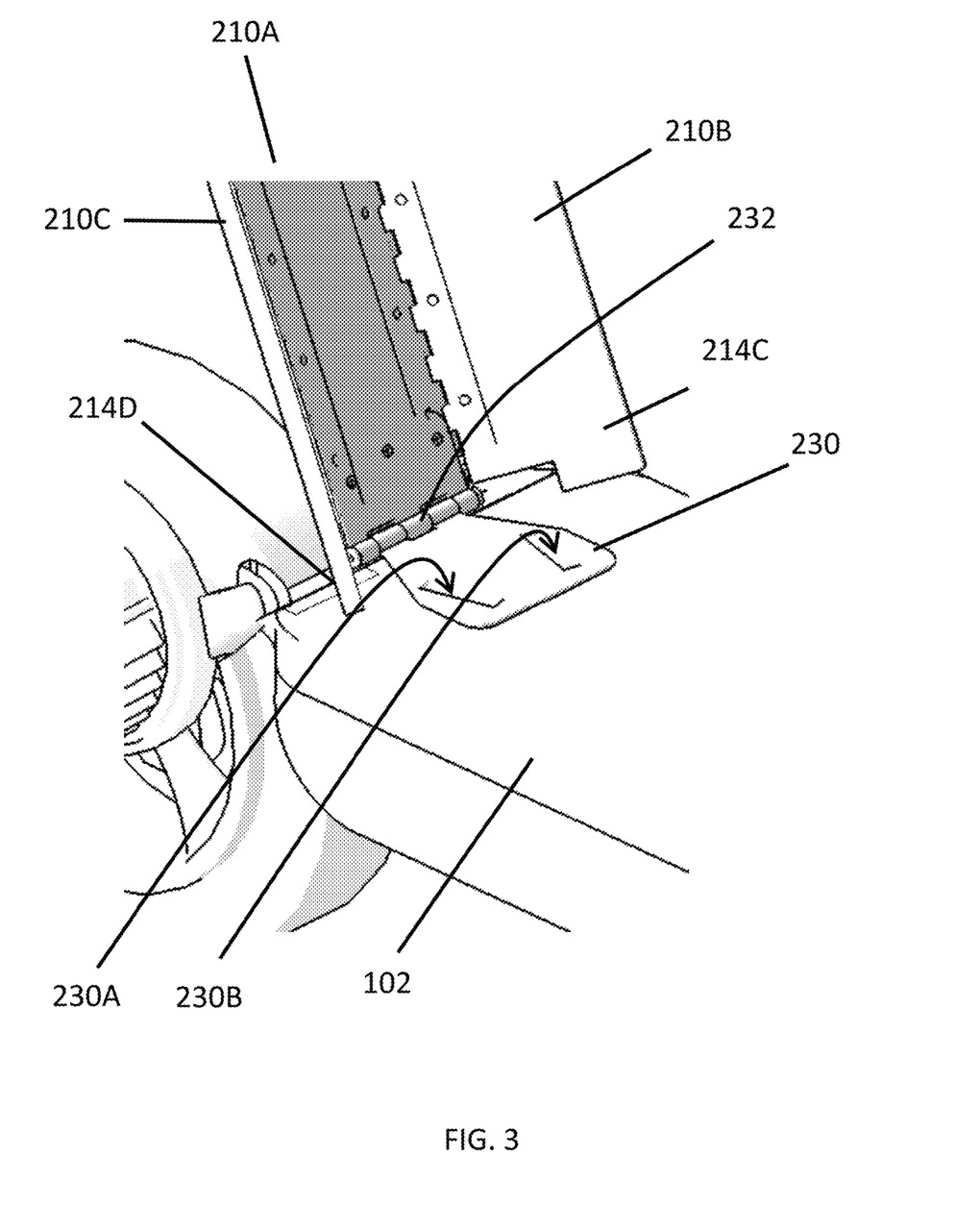
FIG. 3 is a close-up view of the lower seat post attachment of the seat assembly of FIG. 1A.

FIG. 3 is a close-up view of the lower portion of the seat assembly 200. A lower mounting plate 230 is connected to the bottom of the center plate 210A with a bottom hinge 232 and is also securable to the top of the foot deck 102. Two slots 230A, 230B are formed in the lower mounting plate 230. Two tabs 214C, 214D extending from the bottoms of the left and right side plates 210B, 210C are dimensioned to mate with the two slots 230A, 230B, respectively.

Figure 4A:
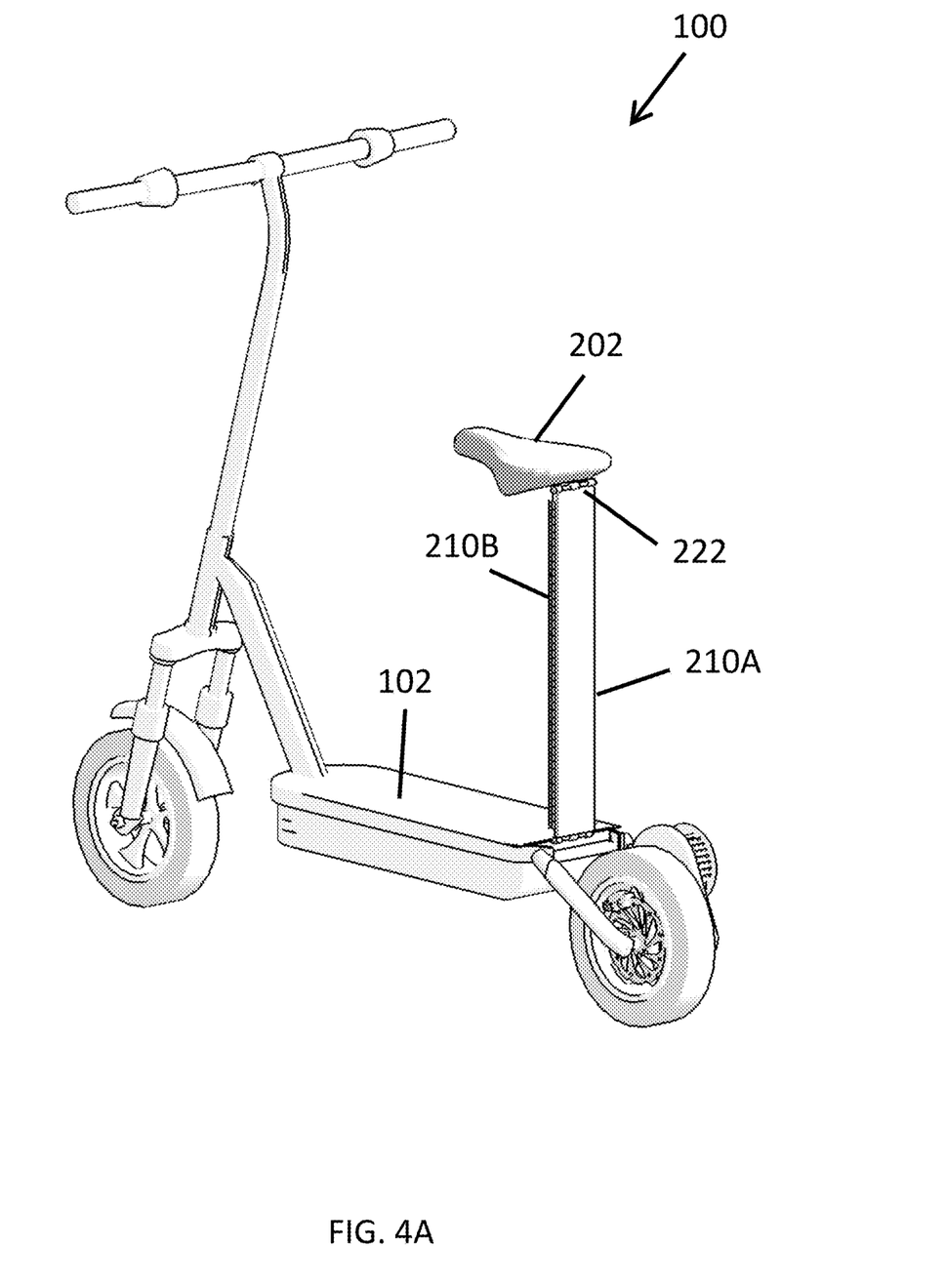
FIG. 4A is a rear perspective view of the scooter of FIG. 1A with the seat assembly in the upright position.
Figure 4B:
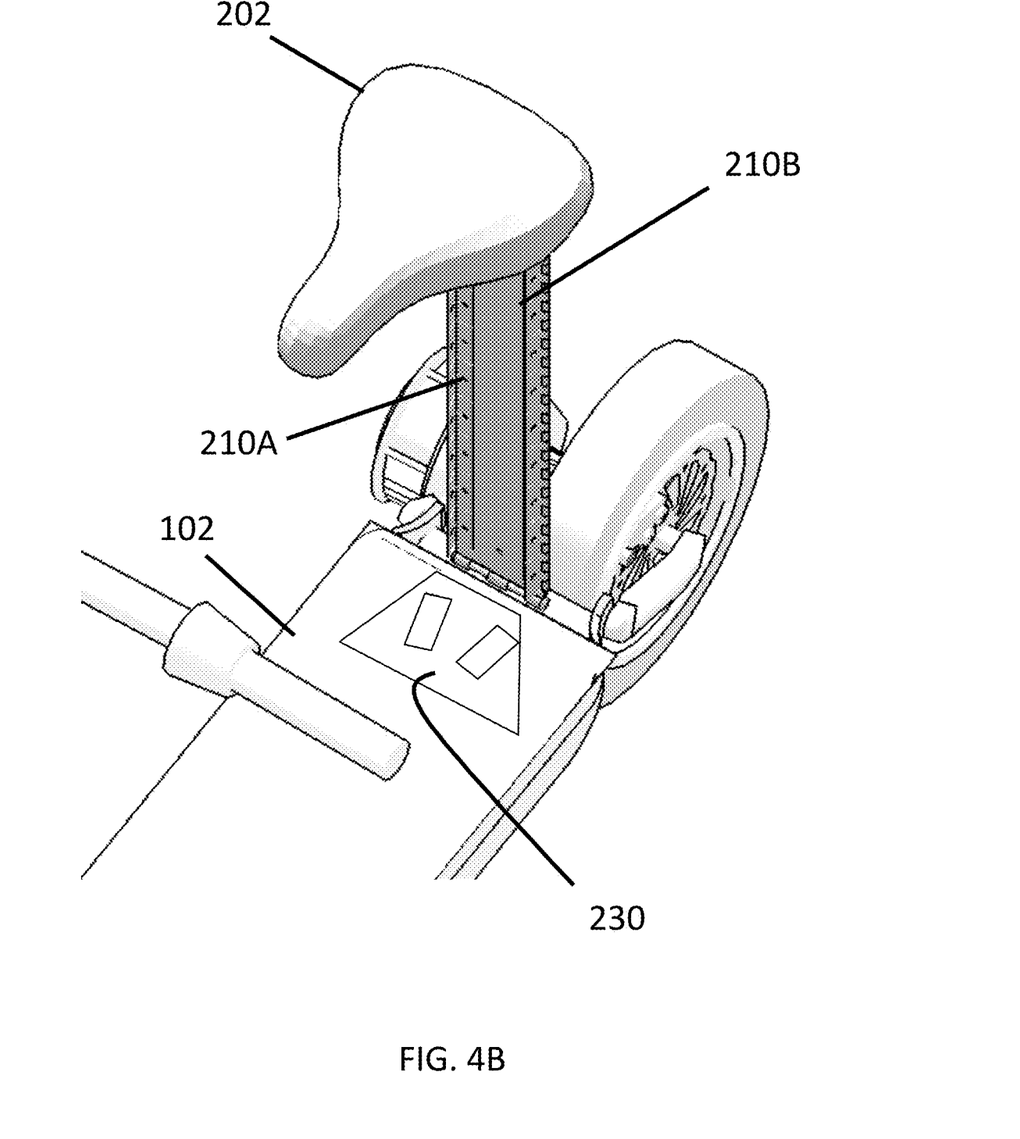
FIG. 4B is a top perspective view of the seat and seat post of the scooter of FIG. 1A.
Figure 5:
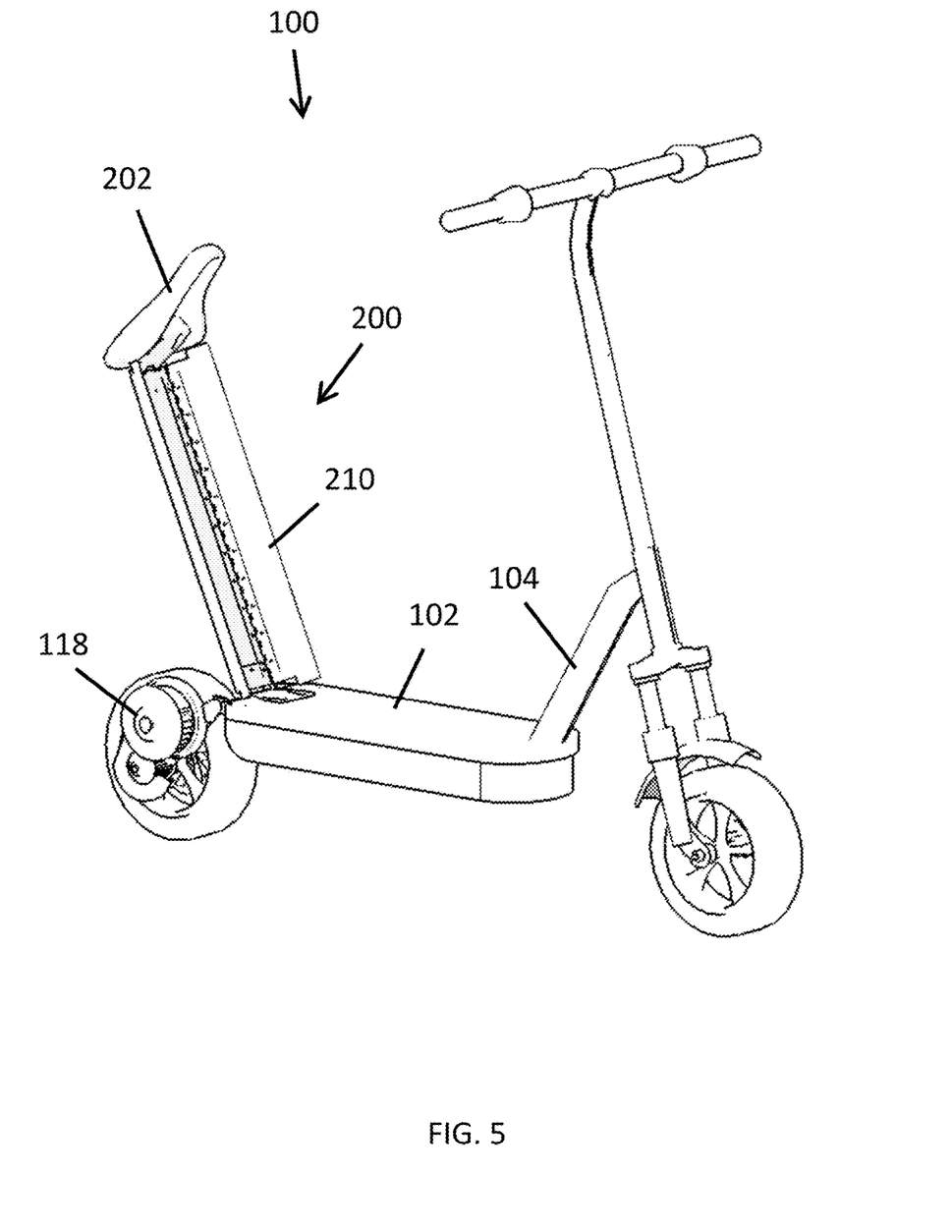
FIG. 5 is a right side perspective view of the scooter of FIG. 1A with the seat post hinged backward prior to being folded.
Figure 6A:
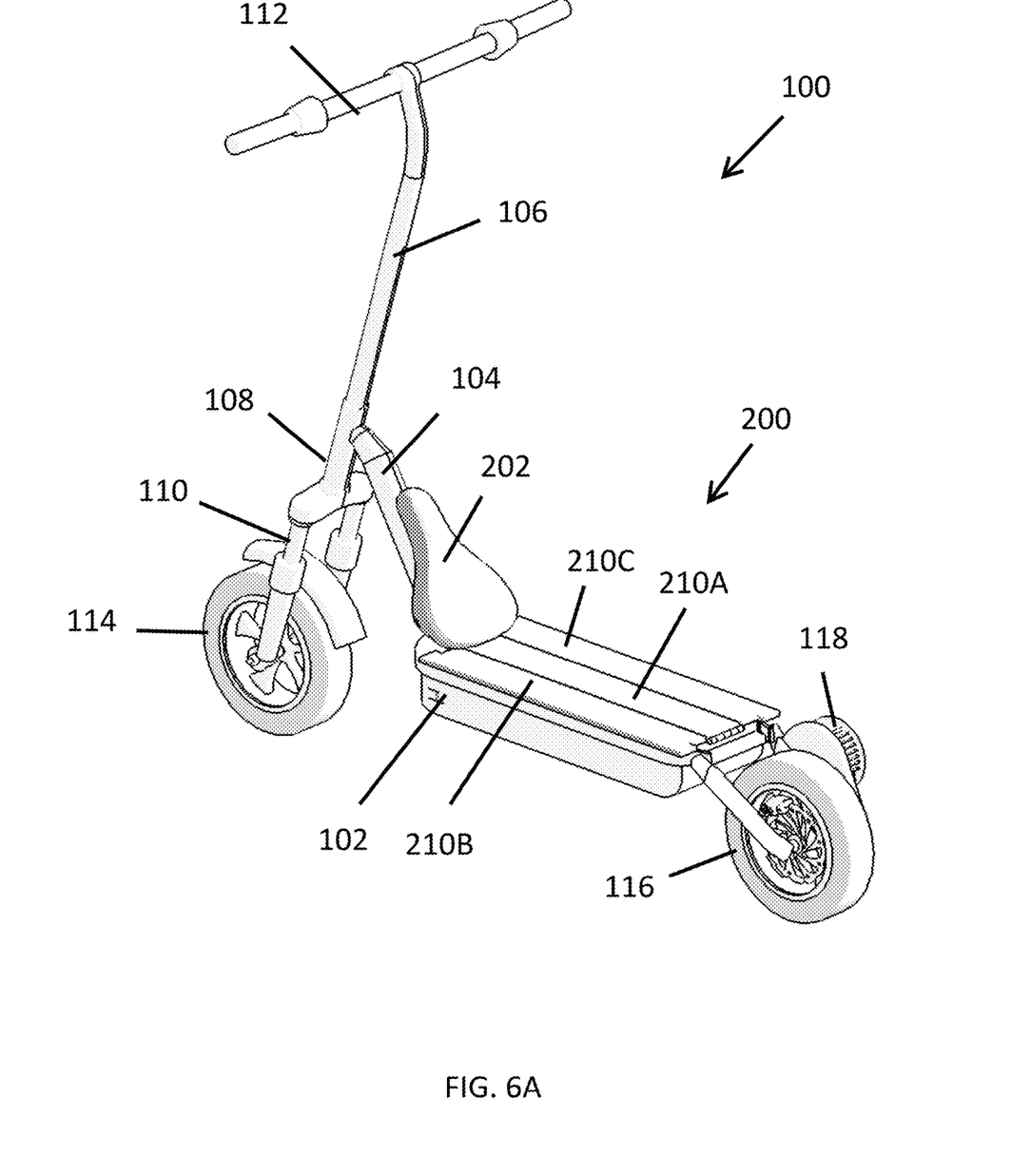
FIG. 6A is a rear perspective view of the scooter of FIG. 1A with the seat assembly in the folded position.
Figure 6B:
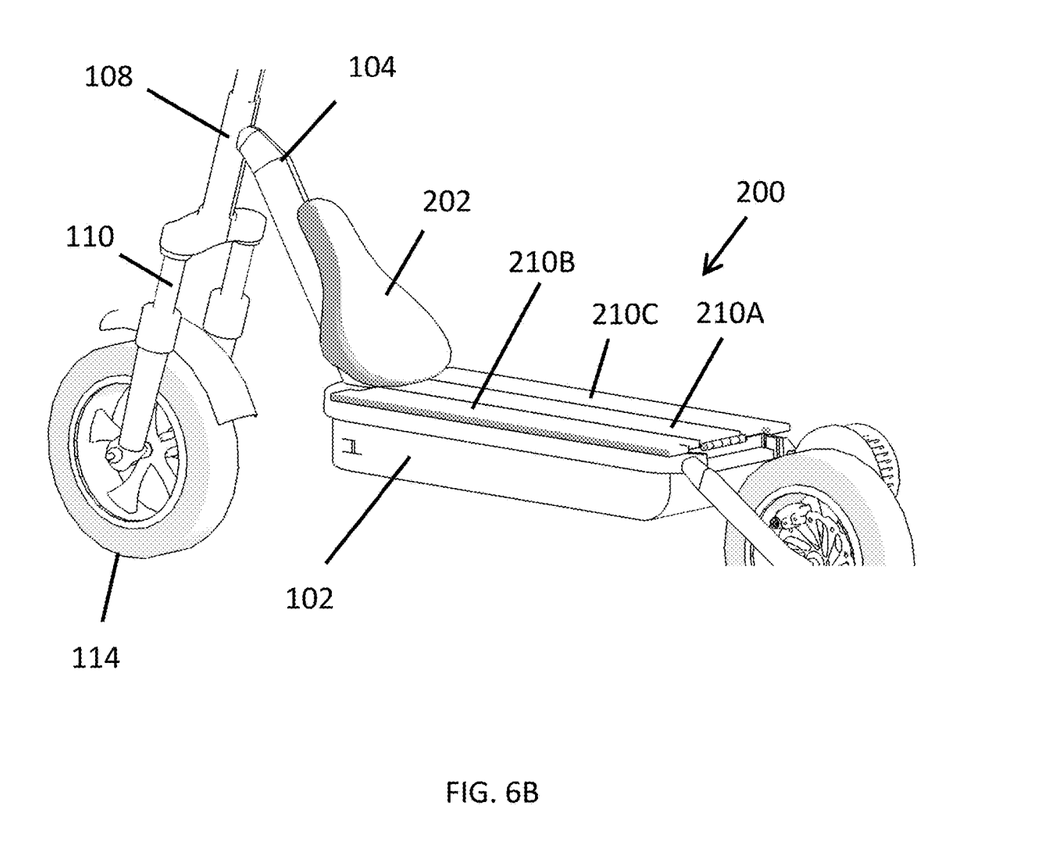
FIG. 6B is a close-up view of the folded seat assembly of the scooter of FIG. 1A.

FIGS. 4A, 4B are perspective views of the scooter 100 with the seat assembly 200 in the upright position for sitting use. To fold the seat assembly 200, the seat 202 is tilted back, towards the rear of the scooter 100, from the top mounting plate 220 on the hinge 222, separating the upper tabs 214A, 214B from the slots 220A, 220B. The seat post 210 is also tilted back from the lower mounting plate 230 toward the rear of the scooter 100, separating the lower tabs 214C, 214D from the slots 230A, 230B (see FIG. 5). The left and right side plates 210B, 210C may then be pivoted outward from the center plate 210A and the entire seat assembly 200 may be lowered onto the foot deck 102. When in the lowered position, the plates 210A, 210B, 210C lie in a plane on top of the deck 102 and become a foot deck for standing use. The seat 202 tilts back and rests out of the way on the upper surface of the neck 104. FIGS. 6A and 6B illustrate the seat assembly 200 in the folded or lowered position.

To place the seat assembly 200 in the upright position, the user raises the seat assembly 200 from its lowered, stowed position and tilts the seat assembly 200 towards the back of the scooter 100. The user may then pivot the left and right side plates 210B, 210C inward until the lower tabs 214C, 214D align with the slots 230A, 230B in the lower mounting plate 230. The seat post 210 is then tilted forward until the lower tabs 214C, 214D engage the slots 230A, 230B. The seat 202 may then be tilted forward until the upper tabs 214A, 214B engage the slots 220A, 220B in the upper mounting plate 220. With the seat assembly 200 secured, the user may sit on the seat 202.

The center and side plates 210A, 210B, 210C may be formed from any material of appropriate strength, such as aluminum, steel, fiberglass, plastic, or carbon fiber, for example. The upper and lower mounting plates 220, 230 are preferably formed from metal, such as aluminum or steel, although other materials of sufficient strength may also be used.

The seat assembly 200 may be installed by a user on an existing scooter by securing the lower mounting plate 230 to the foot deck 102 of the scooter, such as with bolts and nuts through holes in the mounting plate 230 and foot deck 102. The scooter 100 may also be manufactured and sold with the seat assembly 200 already installed or offered as a manufacturer or dealer installed option.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A foldable seat assembly for a scooter, comprising:
   a seat post, comprising:
      an elongated center plate;
      a first elongated side plate connected to a first side of the center plate with a first hinge, the first side plate comprising:
         a first upper tab extending from an upper end; and
         a first lower tab extending from a lower end;
      a second elongated side plate connected to a second side of the center plate with a second hinge, the second side plate comprising:
         a second upper tab extending from an upper end; and
         a second lower tab extending from a lower end; and
   an upper mounting plate, comprising a hinge connected to a top edge of the center plate and attachable to a bottom of a seat, the upper mounting plate having first and second spaced apart slots configured to mate with the first and second upper tabs; and
   a lower mounting plate, comprising a hinge connected to a lower edge of the center plate and attachable to the rear of a foot deck of the scooter, the lower mounting plate having third and fourth spaced apart slots configured to mate with the third and fourth lower tabs;
   wherein, the seat assembly is movable from a substantially upright position for a seated user to a lowered position for a standing user, wherein:
      in the substantially upright position:
         the first and second upper tabs of the first and second side plates are engaged with the first and second slots of the upper mounting plate; and
         the first and second lower tabs of the first and second side plates are engaged with the third and fourth slots of the lower mounting plate; and
      in the lowered position:
         the first and second upper tabs of the first and second side plates are withdrawn from the first and second slots of the upper mounting plate;
         the first and second lower tabs of the first and second side plates are withdrawn from the third and fourth slots of the lower mounting plate;
         the center plate, and the first and second side plates lie in a plane on top of the foot deck; and
         the seat rests on an upper surface of a neck of the scooter.

2. A scooter, comprising:
a foot deck;
a frame, comprising:
- a hollow steering tube;
- an upright stem having a lower portion extending through the steering tube; and
- an angled neck connected at one end to the steering tube and connected at an opposite end to a front end of the foot deck;

a front wheel attached to the lower portion of the stem;
a rear wheel attached at a rear end of the foot deck; and
a seat assembly, comprising:
- a seat;
- a seat post, comprising:
  - an elongated center plate;
  - a first elongated side plate connected to a first side of the center plate with a first hinge, the first side plate comprising:
    - a first upper tab extending from an upper end; and
    - a first lower tab extending from a lower end;
  - a second elongated side plate connected to a second side of the center plate with a second hinge, the second side plate, comprising:
    - a second upper tab extending from an upper end; and
    - a second lower tab extending from a lower end; and
  - an upper mounting plate, comprising a hinge connected to a top edge of the center plate and attachable to a bottom of a seat, the upper mounting plate having first and second spaced apart slots configured to mate with the first and second upper tabs; and
  - a lower mounting plate, comprising a hinge connected to a lower edge of the center plate and attachable to the rear of a foot deck of the scooter, the lower mounting plate having third and fourth spaced apart slots configured to mate with the third and fourth lower tabs;

wherein, the seat assembly is movable from a substantially upright position for a seated user to a lowered position for a standing user, wherein:
- in the substantially upright position:
  - the first and second upper tabs of the first and second side plates are engaged with the first and second slots of the upper mounting plate; and
  - the first and second lower tabs of the first and second side plates are engaged with the third and fourth slots of the lower mounting plate; and
- in the lowered position:
  - the first and second upper tabs of the first and second side plates are withdrawn from the first and second slots of the upper mounting plate;
  - the first and second lower tabs of the first and second side plates are withdrawn from the third and fourth slots of the lower mounting plate;
  - the center plate, and the first and second side plates lie in a plane on top of a foot deck of the scooter; and
  - the seat rests on an upper surface of a neck of the scooter.

* * * * *